June 17, 1969   H. J. PLUMMER   3,449,792
BLOW MOLDING APPARATUS
Filed Sept. 7, 1966   Sheet 4 of 4

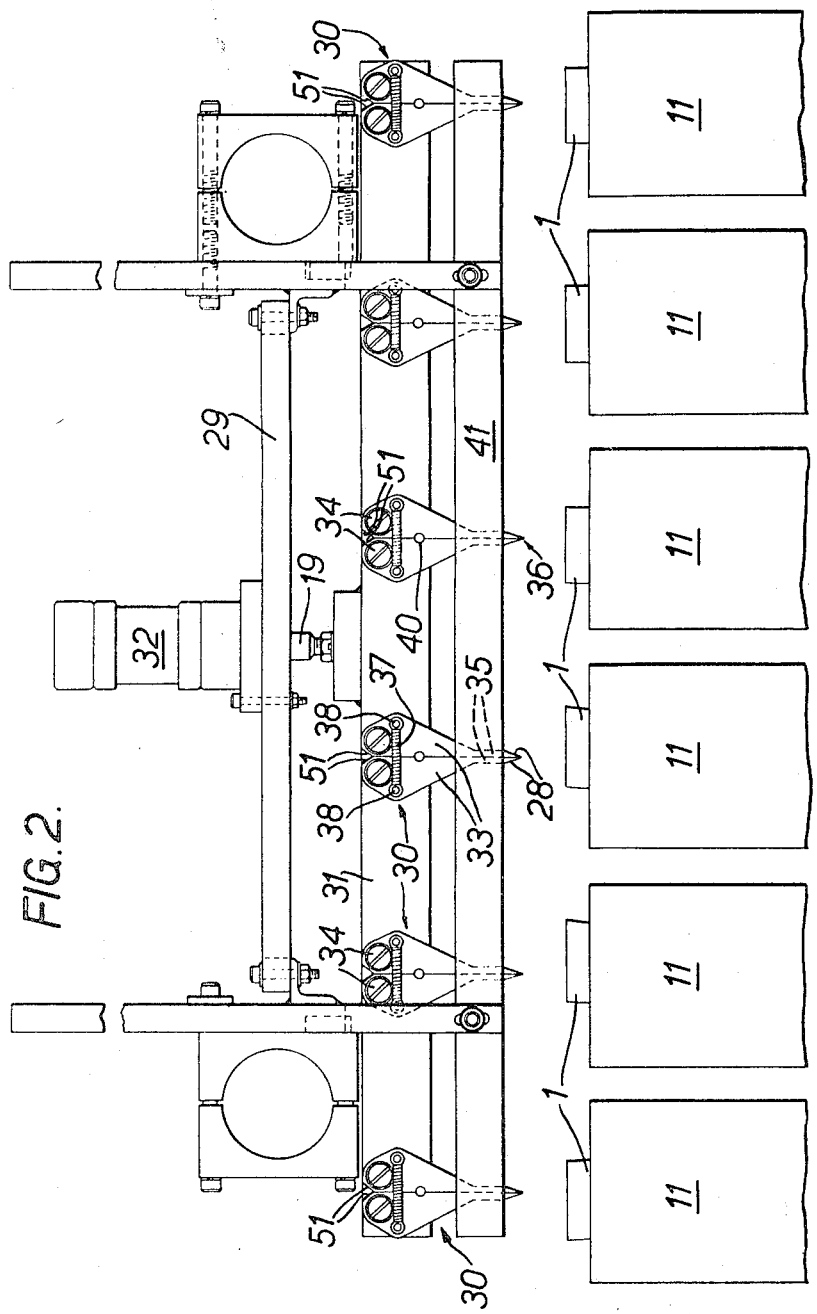

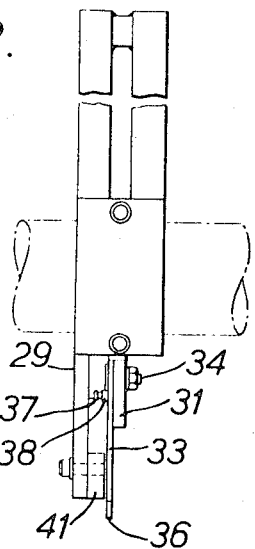
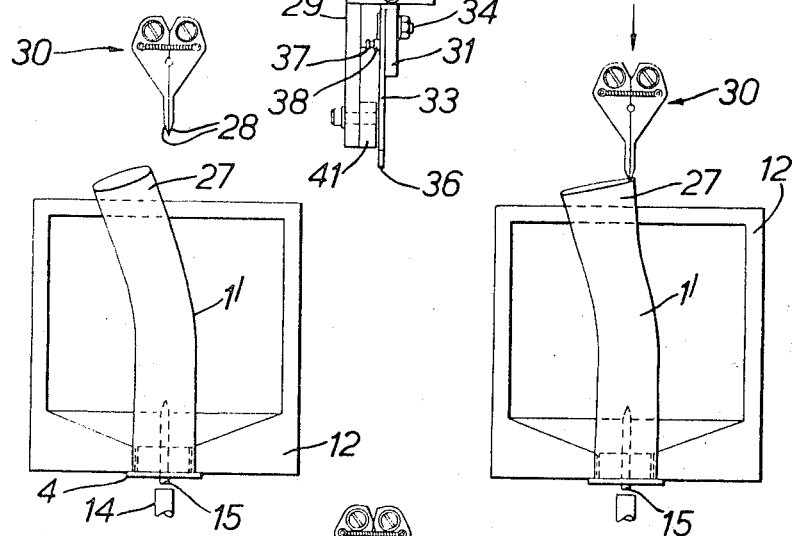
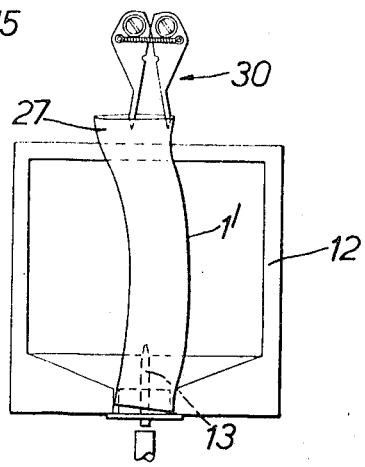

INVENTOR:
HENRY JAMES PLUMMER
BY Kurt Kelman
AGENT 3,449,792
Patented June 17, 1969

1

3,449,792
BLOW MOLDING APPARATUS
Henry J. Plummer, Woodley, England, assignor to Marrick Manufacturing Co. Limited, a British company
Filed Sept. 7, 1966, Ser. No. 577,682
Claims priority, application Great Britain, Oct. 1, 1965, 41,671/65
Int. Cl. B29c 1/14
U.S. Cl. 18—5                      9 Claims

ABSTRACT OF THE DISCLOSURE

Blow molding apparatus with mandrels for supporting individual discrete lengths of thermoplastic tubing. After the mandrels are loaded, the mandrel-supported tubing lengths are heated in an oven to molding temperature, at which they are received at a molding station provided with means for introducing fluid under pressure into each tubing length to expand the same into conformity with mold means to form a molded article. A guide track supports slides which support the mandrels for movement therealong, and the track extends from the oven to and through the molding station, thence to and through an unloading station, where the molded article is removed from the mandrel, and thereafter to and through the loading station to the oven. A drive conveyor extends within the oven and has transverse guides for receiving the slides. The drive conveyor is advanced intermittently and, when it is at rest, at least one of the slides is discharged from the conveyor into the track and advanced in the track. The operations at all stations are coordinated with the slide movement, and before the mold is completely closed, the unsupported end of the tubing length is centered in the mold.

---

This invention relates to the production of articles by a technique known as blow-moulding and in which a straight tube is enclosed in a mould and is expanded therein by injecting fluid under pressure into the tube. The outside wall of the tube is expanded into conformity with the interior surface of the mould and thus has imparted to it the surface finish of the mould. This technique is known as blow-moulding and is used successfully to produce thin-walled hollow articles, such as bottles, from thermoplastics material.

In U.S. Patents Nos. 3,079,637 and 3,149,373, there has been described and claimed a method and apparatus for mass producing blow-moulded articles made of thermoplastics material. The method of production is to extrude the thermoplastics material in the form of a continuous thin-walled tube which is then cooled and cut into sections. When the tube sections are required to be moulded they are dropped onto upright mandrels mounted on a conveyor which carries the tube sections into a thermostatically-controlled oven. The residence time of the tube sections in the oven may be from five to ten minutes and during this period the temperature of the tube sections is raised gradually to the moulding temperature. At the moulding temperature the tube sections

2 are sufficiently soft to be expanded by fluid under pressure injected into them but are rigid enough to support their own weight without bending provided that stresses are not frozen into them during extrusion. If such stresses are present they tend to relieve themselves in the oven and cause the tube sections to warp or bow.

When the tube sections reach moulding temperature they are carried by the mandrels from the oven to a moulding station. Here the hot tube sections or parisons are trapped inside a mould formed by two half-moulds which come together around the parison and pinch its top and while simultaneously forming a seal around the outside surface of its bottom end. When the mandrel is at the moulding station an opening in its underside registers with a nozzle through which fluid under pressure, commonly air, is injected into the parison to expand it in the cavity of the mould. The expansion of the parison into conformity with the inside surface of the mould is completed after a few seconds whereupon the two halves of the mould open and the mandrel conveys the blow-moulded article so produced to an unloading and stripping station where it is removed from the mandrel and surplus plastics material adhering to its base and top are removed.

Apparatus operating as described above can produce blow-moulded articles such as bottles relatively rapidly. However, there is inevitably some wastage due to imperfect blowing or puncturing of the parison during blowing and reject articles are sorted from the acceptable articles at the stripping station.

Desirably the wall thickness of the extruded tubing to be used in the blow-moulding process is as thin as possible. The thinner the wall of the tubing, the less the weight and volume of plastics material in the finished article and the lower will be its final cost. Also, from the mass-production point of view, the time spent by the tube sections in the oven and the time and pressure necessary to expand them in the moulds are both reduced with decreasing wall thickness. However, certain difficulties are experienced when the wall thickness of the tubing is reduced which result in an increasing reject rate of blow-moulded articles and a consequent decrease in efficiency of the process.

Variations in tube wall thickness result in uneven expansion of the parison when being blown and increased likelihood of blow-outs occurring during expansion of the portion of the parison wall of reduced thickness. The presence of stresses frozen into the extruded tubing results in the tube sections bowing or warping when they pass through the oven with the result that banana-shaped parisons emerge from the oven. Such banana parisons cannot be successfully blow-moulded because although the bottom end of the parison is centred in the mould when closed, the top end of the parison is offset as a result of the "lean" of the upper end-portion of the parison induced by the warp. Thus, during blow-moulding, the base of the article which is normally formed at the top of the mould and which requires to be strong, is either ruptured or excessively weak in one region corresponding to that part of the top end of the parison required to expand most as a result of the offset positioning of the top end of the warped parison when the two halves of the mould closed on it.

In accordance with the present invention a blow-moulding station for expanding parisons of plastics material into conformity with a mould cavity defining the shape of an article to be produced, is provided with means which centre both ends of a warped parison in the mould as the mould closes on it prior to blow-moulding.

The advantage of the invention is that the maximum misalignment between the axis of the parison and the axis of the mould occurs at the central part of the mould rather than at the ends. As blow-moulded articles require more structural strength at the ends than at the middle it is possible, by using the invention, to blow-mould curving tube sections, such as banana parisons, to produce acceptable articles. By using the invention it is possible to reduce the reject rate by as much as 15% in the case of P.V.C. tubing. This represents a very substantial saving in production costs. A further advantage of the invention is that for any given banana parison the maximum misalignment between the axis of the mould and the axis of the parison is reduced by half when such misalignment occurs in the central part of the mold. As a result the maximum radial expansion of any part of the parison wall is reduced and therefore a thinner wall thickness of tubing to form the parison can be used successfully. A thinner wall thickness of the parison for producing blow moulded articles of the same physical strength represents a saving in weight and cost and also an increased production speed as the residence time of the parisons in the oven and the moulds is reduced.

Preferably the centering means comprises an expanding device in axial alignment with the axis of the mould cavity and which is introduced while in a contracted state into one end of the parison immediately prior to the instant that the two parts of the mould come together. The device may be inserted while in a contracted condition into the top end portion of the parison and expands therein to centre the top end of the parison immediately prior to the mould closing. Suitably the device only engages the top end of the parison above the position of the pinch formed as the two parts of the mold close on one another.

In our Patent No. 3,149,373, there is described the use of several moulds which open and close together on a line of parisons all at the same temperature. The present invention lends itself to use with such an arrangement and the centering devices individually associated with the moulds are then preferably operated simultaneously by a single operating mechanism.

The invention will now be described in more detail by way of example only, with reference to the accompanying largely diagrammatic drawings, in which:

FIGURE 2 is a side view of apparatus for centering the upper ends of parisons in their moulds;

FIGURE 3 is an end view of the apparatus of FIGURE 2; and

FIGURES 4 to 9 show diagrammatically, in stages, the centering of a warped parison in a mould during closure of the mould and subsequent blow moulding of the parison.

Figure 1:
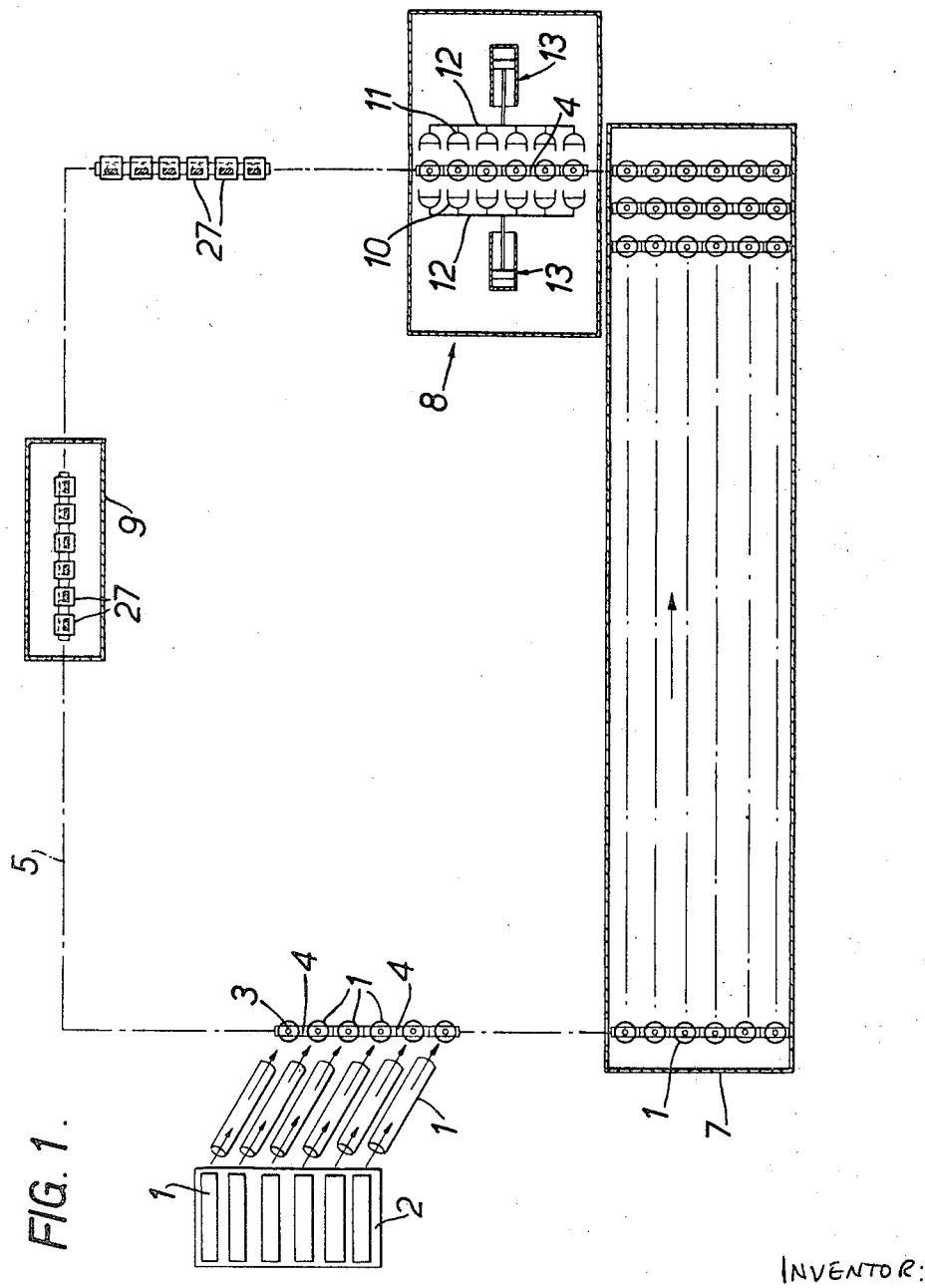
FIGURE 1 is a schematic plan view of apparatus for producing blow-moulded hollow articles.

The blow-moulding apparatus shown in FIGURE 1 is generally constructed in accordance with Patent No. 3,149,373, and blow moulds parisons formed by hot cylindrical sections of extruded polyvinyl chloride tubing which is relatively free of frozen-in stresses. The tube sections are approximately 13½ inches long and have an outside diameter of 1½ inches and a wall thickness of ⅟₁₆ inch. The cylindrical tube sections 1 are stored at a loading station 2 and are lowered six at a time on respective upright mandrels 3 each formed by a thin wire cage projecting upwards from a nozzle 15 mounted in a slider mounted in a slider 4 as shown in FIGURE 4. After loading of the six mandrels 3, the six tube sections are moved as a string into the entrance end of a thermostatically-controlled oven 7.

The strings of six tube sections are conveyed slowly through the oven on their respective mandrels in a direction perpendicular to the string of sliders, and their temperature is slowly and evenly raised to 165° centigrade which is attained at the exit end of the oven shown on the right of FIGURE 1. At this temperature polyvinyl chloride is sufficiently hard to be self-supporting yet is sufficiently soft to be blow-moulded. During the residence time of the tube sections 1 in the oven 7 any stresses frozen into them are relieved and cause warping, bowing or leaning resulting in the formation of "banana" parisons. In practice about 10% of the parisons are commonly affected in this way.

The parisons are conveyed in their strings of six and whilst still on their mandrels from the oven 7 to a moulding station 8. At the moulding station 8 each of the mandrels 3 is centered between two spaced half-moulds 10, 11 each carried by a bar 12 moveable towards and away from the mandrels by a hydraulically operated ram 13. The slider 4 beneath each of the mandrels is located directly above an outlet 14 (see FIGURE 4) which registers with a passage in a nozzle 15 at the base of the mandrel 3 for injecting air under pressure into the parison during blow-moulding.

When the two half-moulds 10, 11 are pressed together by their respective rams 13 they provide a mould cavity in the shape of the outside wall of an inverted square cross-section bottle. The axial length of the bottle is approximately one foot and the top of the parison is pinched at 21 (see FIGURE 8) between closing surfaces at the top of the mould when the two half-moulds come together so that air does not leak through the top of the parison during moulding. As the two half-moulds come together the bottom portion of the parison is firmly compressed in diameter around a neck 23 beneath the nozzle so that no leakage of injected air occurs around the neck of the upturned bottle while being moulded.

The six moulds open and close together under the control of the two hydraulic rams 13. When a set of six parisons reaches the moulding station 8 the lower end of each parison is automatically centered in the lower end of the mould by the correct positioning of a flange (not shown) on the slider 4 at the base of the mandrel 3 and on which the bottom rim of the parison rests. The top ends of the parisons are also centered, prior to the six moulds finally closing, by means of six centering devices 30 one being associated with each mould as shown in FIGURE 2.

The six centering devices 30 are shown in FIGURES 2 and 3 and are mounted on a horizontal bar 31 which is vertically moveable by an hydraulically operated piston unit 32. The piston unit 32 comprises a cylinder fixed to a stationary frame 29 and in which is a moveable piston connected by a downwardly directed piston rod 19, which passes through part of the frame, to the centre of the bar 31. Each centering device 30 is of caliper form and comprises two arms formed by respective thin metal plates 33 approximately 3½" long lying edge to edge in a vertical plane. Each arm or plate is of generally triangular shape and has its upper portion pivoted at 34 to the bar 31 and its lower portion depending beneath the bar and formed with a downwardly directed finger-like spike 35 having converging flat surfaces 28 which taper to a point 36 at its lower end. The two plates are arranged with their hypotenuses touching one another and the points of the two spikes lie on the continuation line of the two hypotenuses. The two plates, together, resemble a kite split down the centre and provided with a downwardly pointing tail approximately 1" long provided by the spikes and which tapers over the bottom ⅜" to the sharp point 36 lying on the division line of the kite. The two plates are held hypotenuse to hypotenuse by a coil spring 37 extending horizontally beneath the pivots 34 of the plates and anchored at opposite ends to two pins 38 which project from regions of the plates disposed beneath and outwardly of the pivotal positions 34. A semicircular hole 40 is formed in the hypotenuse of each plate approximately 1½" beneath its upper end. The periphery of the upper end of each plate is angular about its pivotal axis 34, and provides a flat edge 51 which by engaging the flat edge 51 of the other plate limits opening movement of the caliper.

A horizontal beam 41 extends alongside the downwardly directed points 36 of the plates on the side opposite to the bar 31 on which the plates are pivoted, as shown in FIGURE 3. The beam 41 is rigidly fixed to the frame 29 of the moulding apparatus and although it is spaced from the surfaces of the plates 33 it provides an abutment face which obstructs downward movement of the pins 38 on the plates when the bar 31 has been lowered by the piston unit 32 a little more than 1".

FIGURES 4 to 9 show stages in the centering of a warped parison in its mould and its subsequent blow moulding. The warped parison is referenced 1¹, and one half 12 of the mould is shown behind it. In all of the stages the slider 4 is stationary in the centre of the mould so that when an unwarped parison is being blow-moulded it stands at its base on the centre line of the mould.

FIGURE 4 shows the mould before closing and with the warped parison 1 having its bottom end centred in the mould and its top end-portion leaning towards the left.

FIGURE 5 shows the commencement of final closing movement of the two halves of the mould during which the upper end-portion of the parison starts to get pinched between the closing surfaces at the upper end of the mould. The pinching results in its upper end-portion being distorted from a circular cross-section to an elliptical cross-section, the major axis of the ellipse coinciding with the parting line of the mould. Should the lean of the parison being in the direction of movement of the closing half moulds, that is to say perpendicular to the plane of the paper in FIGURE 4, the parison will normally twist about the mandrel during mould closing until its upper end leans in the direction of the parting line of the mould.

During closing movement of the two half-moulds around each parison to the position shown in FIGURE 5, hydraulic fluid under pressure is admitted behind the piston unit 32 (FIGURES 2 and 3) which is arranged to move the bar 31 carrying the centering devices 30 vertically downwards. During the first inch of downward movement of the bar 31 the caliper devices 30 remain closed and the points 36 at their lower ends enter the top end portions 27 of the parisons as shown in FIGURE 5. The elliptical deformation of the top end portion 27 of the parison at this stage coincides with the direction of opening movement of the caliper centering device 30 so that there is very little risk indeed of the bowing of any of the parison being such that the centering device fails to enter its top end. The axis of the centering device 30 coincides with the axis of the moulds beneath and it would therefore be necessary for the top end portion of the banana parison 1¹ to have its axis displaced relative to the axis of the mould by rather more than half the internal diameter of the parison for the point 36 of the caliper device 30 to miss the open end of the parison altogether. A banana parison having a displacement at its top end as great as this is most unlikely.

Figure 7:
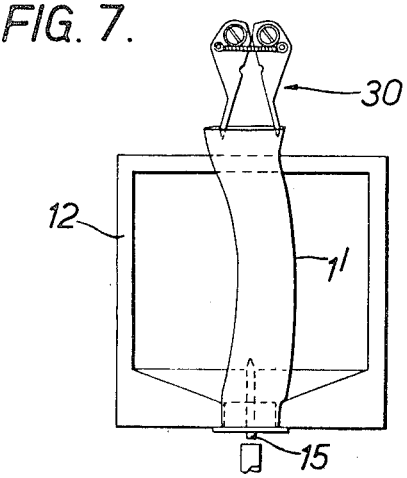

After the caliper device 30 has moved down one inch the pins 38 of the caliper plates 33 engage the beam 41 which prevents them from descending further. As a result further downward movement of the bar 31 causes the two plates 33 of each device to rotate about their pivot points 34 in opposite directions so that the two spikes 35 of the pointed end of each caliper device start to separate by equal amounts as shown in FIGURE 6. The terminal portions of the spikes are cut at such an angle that the flat surfaces 28 engage the inside wall of the parison when the caliper device is opened. Turning to FIGURES 6 and 7 it will be seen that the opening movement of the caliper device corrects any misalignment between the axis of the top end 27 of the parison and the axis of the mould which is still closing about the parison. Thus the top end of the parison 1¹ is centred in the mould before closure by the device 30 and the bottom end of the parison 1¹ is centred in the mould by the mandrel assembly. Misalignment between the parison axis and the mould axis therefore now occurs mainly in the central portion of the mould where it does not matter as this portion of the parison is in any case going to be blow-moulded as shown in FIGURE 6 and need not be strong in the finished bottle.

Figure 8:
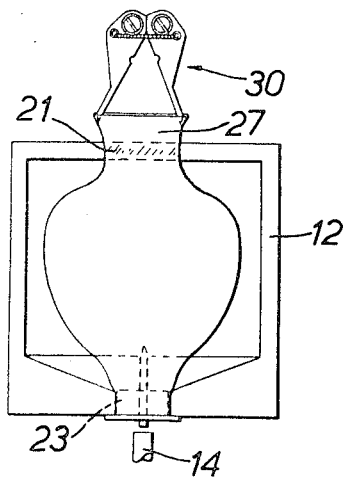
Figure 9:
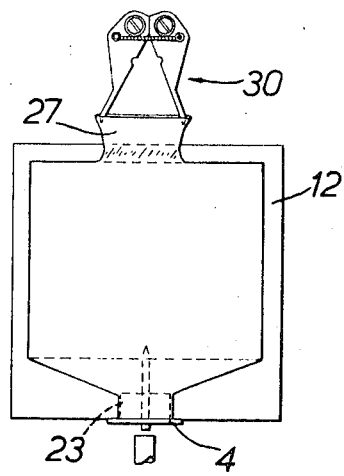

The opening movement of the caliper device 30 takes place rapidly and is completed before final closing of the mould so that the later pinching of the top end portion of the parison between the two parts of the mould as shown at 21 in FIGURES 8 and 9 is not influenced by the open caliper device 30 the points 36 of which are disposed above the two parts of the mould.

When the mould has closed, air under pressure in injected into the parison 1¹ through the nozzle 15 to expand its outside surfaces into conformity with the interior surface of the mould as shown in FIGURES 8 and 9. Blowing of the parison takes approximately five or six seconds after which time the mold is opened. The caliper device 30 is still engaged with the top end portion 27 of the blown parison above the pinch 21 at this time, so that the blown bottle formed in the mould is held in axial alignment with the mould cavity during mould opening. As a result the risk of distortion of the bottle through being locked into one or other half of the mould is avoided, such risk being present when the bottle is provided with strengthening corrugations. Immediately after the mould is opened the centering device 30 is closed and raised by the bar 31 and the mandrel 13 carries the hollow moulded article, so made, to the unloading and stripping section shown at 9 in FIGURE 1. Here the article is checked for faults and superfluous plastics material such as the portion 27 is stripped from it at the pinch 21. The reject rate of mass-produced blow-moulded articles made of polyvinyl chloride on the apparatus described above can be reduced from 20% to 5% by the use of the centering devices.

The great reduction in waste obtained by using the invention means that for a given apparatus the capacity and therefore the size of the waste handling equipment can be reduced, the production rate of blow moulded articles is increased, and the cost per bottle is reduced substantially. Further the centering of the top end of a warped parison in the mould so that it produces a good base to the bottle enables a thinner parison tube to be used without loss of strength to the bottle where it matters, namely, the base. A consequence of this is that the weight and cost of the bottle is reduced, the oven heating time is reduced, the production rate is increased and the cost of running the apparatus is reduced.

It will be understood that the apparatus described above is operated cyclically in accordance with a prearranged programme by central equiptment not shown but which is well known in the art. The various stages from the placing of parisons onto the mandrels at the loading station 2 to the removal of finished parisons at the unloading and stopping section 9 therefore occurs in a strict timed sequence.

I claim:
1. Apparatus for blow moulding hollow articles from tubular parisons of thermoplastics material, comprising: a plurality of mandrels for supporting individual discrete lengths of thermoplastics tubing, a loading station including means for loading said mandrels with said tubing lengths, an oven for heating mandrel-supported tubing lengths to moulding temperature, a moulding station including mould means adapted to receive at least one of said mandrel-supported tubing lengths at moulding temperature and means for introducing fluid under pressure into said tubing length to expand same into conformity with said mould means to form a moulded article, an unloading station including means for removing said article from said mandrel, slides supporting said mandrels, a guide track supporting said slides for movement therealong and extending from said oven to and through said moulding station, thence to and through said unloading station and thereafter to and through said loading station to said oven. A drive conveyor extending within said oven, said conveyor including transverse guides for receiving said slides for conveyance through said oven in side-by-side spaced-apart relationship, means for intermittently advancing said drive conveyor, means operative when said drive conveyor is at rest for discharging at least one of said slides from said drive conveyor into said guide track while advancing said slides in the latter to feed a corresponding number of said slides from said guide track into said drive conveyor, means coordinating the operations at said stations with the movement of said slides in said guide track, and centering means at the moulding station operative before complete closure of the mould to centre the unsupported end of the tubing length in the mould.

2. Apparatus as set forth in claim 1, in which the centering means comprises a caliper device having a tapered lower end which enters the upper end portion of the tubing length and means for expanding said centering means symmetrically with respect to the mould cavity axis to centre said unsupported end of the tube length in the mould before complete closure thereof.

3. Apparatus as set forth in claim 1, in which said centering means comprises a downwardly pointed caliper device formed with two arms which, during closing movement of the mould, enter the top end of the tube length and thereafter are expanded symmetrically with respect to the mould axis so that the arm extremities move in the plane of the parting line of the mold and engage the inside upper wall of the tube length to centre said top end in the mould prior to complete closure thereof.

4. Apparatus for blow moulding hollow articles from discrete lengths of thermoplastic tubing, comprising a plurality of groups of mandrels for supporting individual discrete lengths of thermoplastic tubing, a loading station including means for simultaneously loading each of said mandrels in one of said groups with a tubing length, an oven for heating at least one group of mandrel-supported tubing lengths to moulding temperature, a moulding station including mould means adapted to receive said group of mandrel-supported tubing lengths at moulding temperatures, and means for simultaneously introducing fluid under pressure into tubing lengths of said group at said moulding station to expand said tubing lengths into conformity with said mould means, an unloading and stripping station including means for simultaneously removing moulded articles from said group of mandrels, conveyor means including means for intermittently moving said mandrels in a closed noncircular path to advance each said group of mandrels successively from said unloading station to said loading station, thence to and through said oven, thence to said moulding station and thereafter to said unloading station, means coordinating the operations at said stations with the movement of said mandrels by said conveyor means, and centering means associated with each of said group of mandrel-supported tubing lengths at said moulding station said centering means tapering downwardly for entry into the upper ends of said mandrel-supported tubing lengths, and means for lowering said centering means into said upper ends and thereafter symmetrically expanding said centering means in said upper ends of the mould symmetrically with respect to said mould axis to centre said upper ends with respect to said axis before complete closure of said mould.

5. Apparatus as claimed in claim 4, in which said centering means comprise caliper devices mounted at spaced intervals along a horizontal vertically movable bar, each said caliper device comprising two arms pivoted at their upper ends to said bar, and means for translating downward movement of said bar into opening movement of said caliper means after entry of the lower end of said caliper means into said tubing length.

6. Apparatus as claimed in claim 4, in which said centering means are raised and lowered by a single piston and cylinder device operatively connected to a horizontal bar on which said centering means are mounted.

7. Apparatus for forming hollow articles from thermoplastic material, comprising a plurality of groups of mandrels for supporting individual discrete lengths of thermoplastic tubing, a loading station including means for loading each of said mandrels in one of said groups with a tubing length, an oven for heating at least one group of mandrel-supported tubing lengths to moulding temperature, a moulding station including a plurality of mould means composed of mould parts movable in synchronism towards and away from one another to close and open moulding cavities respectively, each such cavity having an internal contour corresponding to the external shape of said article and being adapted to receive with the other cavities a group of mandrel-supported tubing lengths at moulding temperature, means for simultaneously introducing fluid under pressure into said group of tubing lengths at said moulding station to expand said tubing lengths into conformity with the insides contour of said cavities, an unloading and stripping station for removing moulded articles from said group of mandrels, conveyor means including means for moving said mandrels in a closed noncircular path to advance each said group of mandrels successively from said unloading station to said loading station, thence to and through said oven, thence to said moulding station and thereafter to said unloading station, caliper centering means individually associated with said moulding cavities and disposed above said mould parts, means for lowering said caliper centering devices into the upper ends of said tube lengths during movement of said mould parts together, means for expanding said caliper centering means in the upper ends of said tubing lengths during the terminal part of movement of said mould parts together for centering the upper ends of said tubing lengths with respect to said mould cavity axis, means for retaining said caliper centering devices in engagement with the upper ends of said tubing lengths until the parts of the moulds have moved apart after formation of the blow moulded article in the mould cavity such means then contracting and withdrawing the caliper devices, and means coordinating the operations at said stations with movement of said mandrels by said conveyor means.

8. Apparatus as set forth in claim 6, in which said centering means comprise half-kite shaped flat metal plates which taper downwardly to a point and are pivotally connected at their upper ends to a bar common to all of centering devices.

9. Apparatus for blow moulding hollow articles from hot tubular lengths of thermoplastics material, comprising mould parts movable together to define a moulding cavity around a tube length and movable apart to open the cavity and allow the blow moulded article produced therein to be released from the mould, support means for carrying said tube lengths in an erect position and movable lengthwise of a gap formed between the open mould parts, means for injecting air under pressure into said tube length to expand it inside the closed mould cavity and into conformity with the contour of the cavity wall, and means associated with the mould for centering the unsupported end of the tube length in relation to the mould cavity axis before the mould closes around the tube length, said centering means comprising two metal plates spring urged towards one another and pivotally connected to a downwardly movable bar, projections extending laterally away from said plates beneath the positions of said pivotal connections to the bar, means for reciprocating the bar vertically, and an abutment surface beneath said projections for engaging therewith after the bar has lowered the lower end of the centering means into the top end of the tube length whereby said plates are rotated about their pivotal connections with a caliper action and their lower ends engage the inside wall of the tube length at its top end to centre it in the mould cavity before complete closure of the mould parts and while said mould parts are squeezing the upper end portion of said tube section from a circular cross section to an elliptical cross section.

References Cited

UNITED STATES PATENTS

| | | | |
|---|---|---|---|
| 3,149,373 | 9/1964 | Marzillier | 18—5 |
| 3,278,665 | 10/1966 | Harrison | 18—5 |
| 3,283,046 | 11/1966 | De Witt et al. | 18—5 X |
| 3,324,507 | 6/1967 | Arlo | 18—5 |
| 3,339,230 | 9/1967 | Farrell | 18—5 |

WILBUR L. McBAY, *Primary Examiner.*

U.S. Cl. X.R.

264—94